United States Patent
Kolb et al.

(10) Patent No.: US 7,793,859 B2
(45) Date of Patent: Sep. 14, 2010

(54) FLUIDIZED CATALYTIC CRACKING FEED NOZZLE

(75) Inventors: Norman Kolb, Houston, TX (US); Ed Yuan, Houston, TX (US); Louis Robert Anderson, Houston, TX (US); Gary Jackson, Katy, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 312 days.

(21) Appl. No.: 11/402,108

(22) Filed: Apr. 11, 2006

(65) Prior Publication Data
US 2007/0246574 A1    Oct. 25, 2007

(51) Int. Cl.
B05B 17/04    (2006.01)
B05B 1/18     (2006.01)
B05B 1/14     (2006.01)
B05B 1/00     (2006.01)
B05B 1/26     (2006.01)
A62C 31/02    (2006.01)

(52) U.S. Cl. .................. 239/11; 239/567; 239/568; 239/597; 239/598; 239/601

(58) Field of Classification Search .............. 239/548, 239/567, 568, 596, 597, 598, 599, 601, 1, 239/11
See application file for complete search history.

(56) References Cited

U.S. PATENT DOCUMENTS

| 5,244,154 A | * | 9/1993 | Buchholz et al. | 239/590.3 |
| 5,306,418 A |   | 4/1994 | Dou et al. |  |
| 5,673,859 A | * | 10/1997 | Haruch | 239/568 |
| 5,794,857 A |   | 8/1998 | Chen et al. |  |
| 5,979,799 A | * | 11/1999 | Chen et al. | 239/430 |
| 6,070,811 A | * | 6/2000 | Takeda et al. | 239/533.12 |
| 6,142,392 A | * | 11/2000 | Takeda et al. | 239/533.12 |
| 6,161,781 A | * | 12/2000 | Kojima et al. | 239/533.12 |
| 6,631,851 B1 | * | 10/2003 | Adkins et al. | 239/7 |
| 6,726,127 B2 | * | 4/2004 | Hofherr et al. | 239/432 |

FOREIGN PATENT DOCUMENTS

| EP | 0 933 135 A2 | 4/1999 |
| FR | 2 644 795 | 9/1990 |
| WO | WO 2005/047427 A1 | 5/2005 |

* cited by examiner

*Primary Examiner*—Dinh Q Nguyen
*Assistant Examiner*—Ryan Reis
(74) *Attorney, Agent, or Firm*—Locke Lord Bissell & Liddell, LLP; Alan B. Clement; Peter J. Fallon

(57) ABSTRACT

A nozzle for the atomized spray of liquid hydrocarbon feed in a fluidized catalytic cracking apparatus having two or more slots with at least one lateral slot wall formed at an angle of from about 30 to about 60 degrees from the axis of the discharge. Also a method of spraying atomized hydrocarbon feed/steam into a fluidized catalytic cracking reactor using the nozzle described.

7 Claims, 4 Drawing Sheets

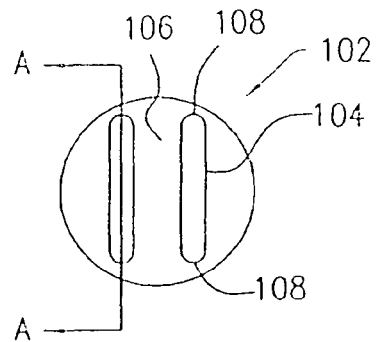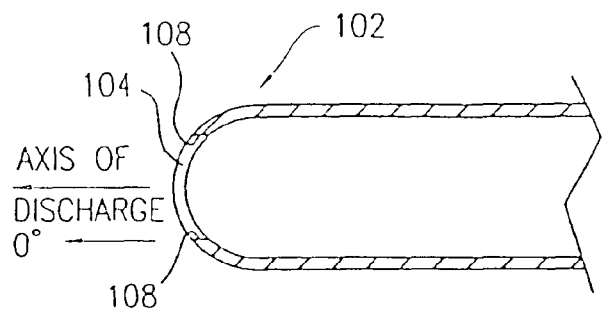
(PRIOR ART)
FIG. 1A
(PRIOR ART)
FIG. 1B
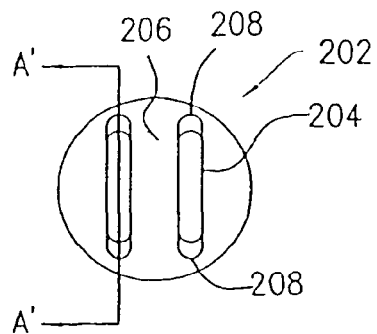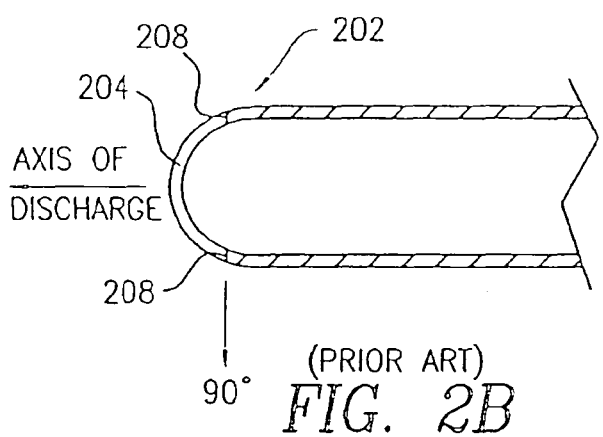
(PRIOR ART)
FIG. 2A
(PRIOR ART)
FIG. 2B
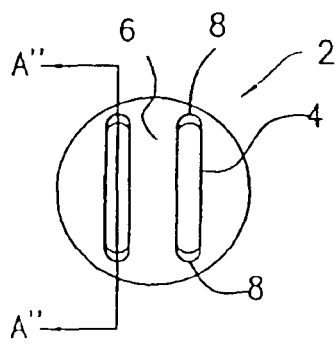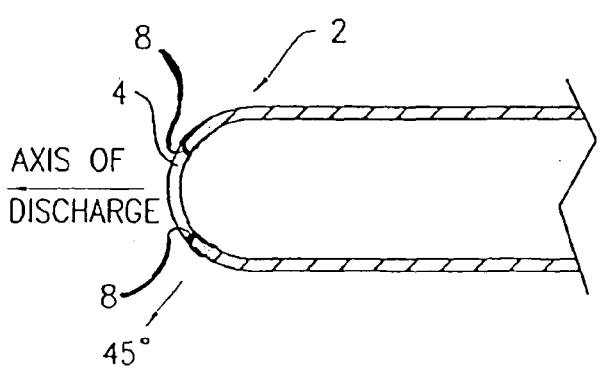
FIG. 3A
FIG. 3B

*FIG. 2C*
*(PRIOR ART)*
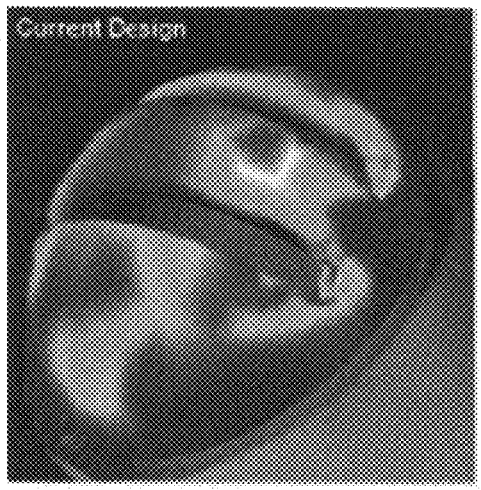
*FIG. 3C*
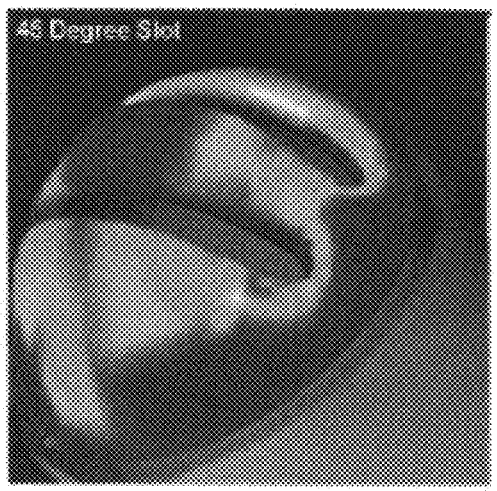
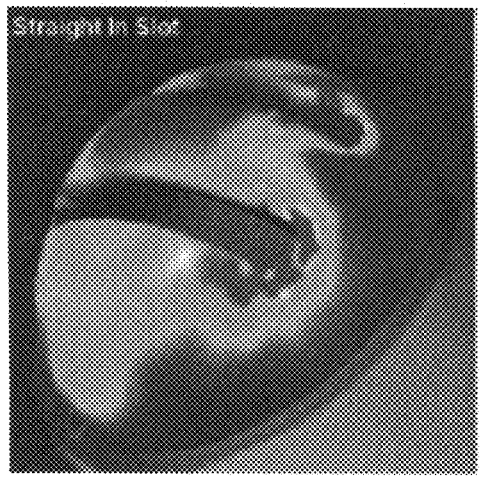
*FIG. 1C*
*(PRIOR ART)*

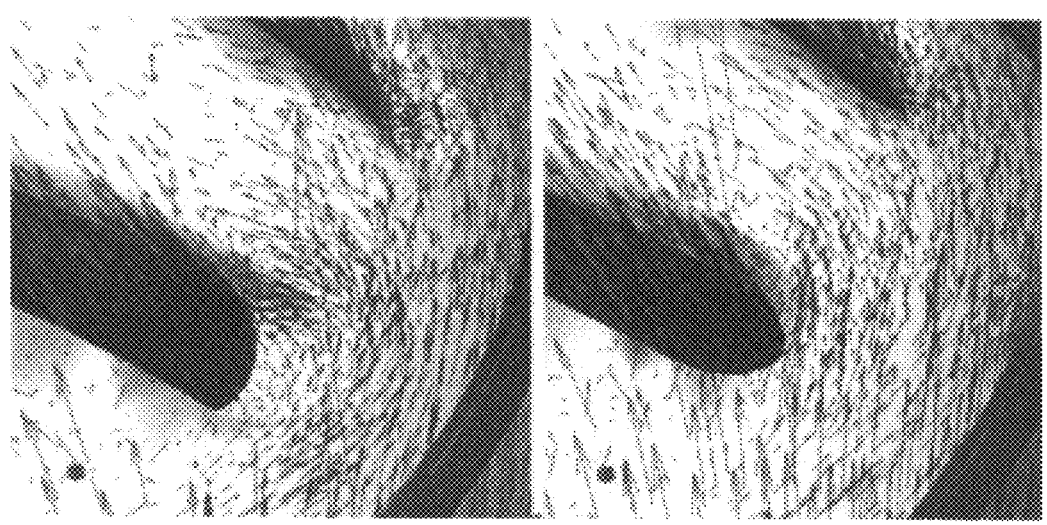
*FIG. 4A*  *FIG. 4B*

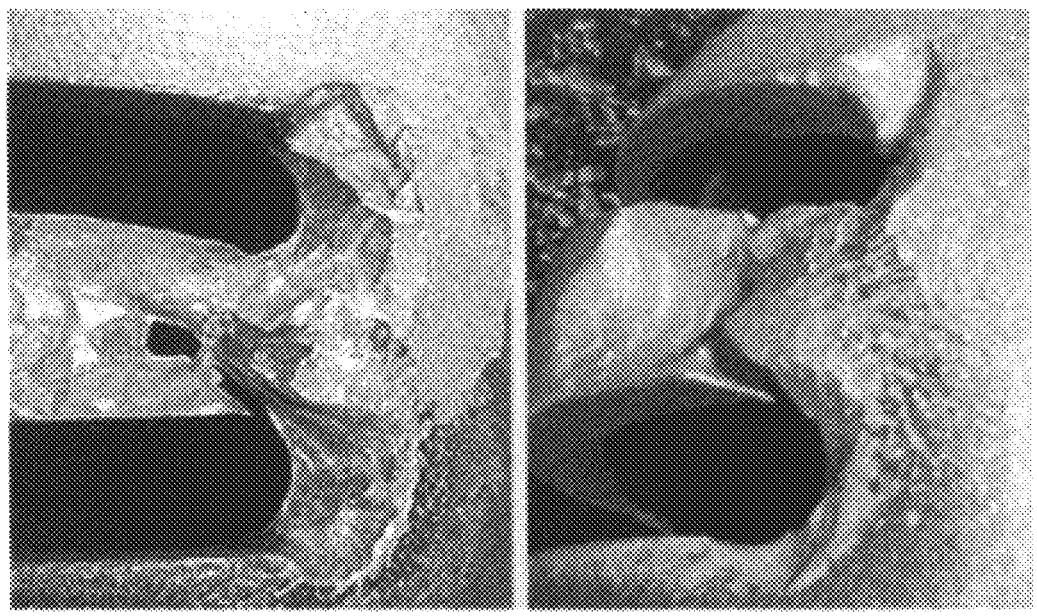
*FIG. 5A*  *FIG. 5B*

FLUIDIZED CATALYTIC CRACKING FEED NOZZLE

FIELD OF THE INVENTION

The present invention relates to a spray nozzle for discharging an atomized hydrocarbon feed used in fluidized catalytic cracking reactor. More particularly, the invention relates to the physical geometry of the slots in a double slot feed nozzle to improve nozzle efficiency and life.

BACKGROUND OF THE INVENTION

Efficiency in a fluidized catalytic cracking (FCC) apparatus is dependent on a number of factors. One important factor is the energy used to atomize the liquid hydrocarbon feed introduced into the FCC reactor.

In general, the liquid hydrocarbon feed is atomized by a gas such as steam for discharge through a nozzle into the FCC reactor. The amount of steam used to atomize the liquid hydrocarbon feed impacts directly on the efficiency of the reaction. The shape and number of slots in the nozzle have also been found to impact directly on the atomization of the liquid hydrocarbon feed.

Additionally, it is well known that the FCC reaction yields improved results when the fluidized feed introduced into the reactor has a large surface area. In this regard, the smaller the size of the droplets, or the finer the spray from the nozzle, the larger the surface area of the fluidized feed. Creating a fine spray of the hydrocarbon feed from the nozzle using less steam results in greater efficiency of the fluidized catalytic cracking system.

Earlier nozzles used to atomize the fluid hydrocarbon feed had a generally hemispherical discharge end formed with a single elongated slot-like orifice adapted to produce a flat fan-like spray. An example of such a nozzle is described in U.S. Pat. No. 5,306,418 to Dou et al.

Later nozzles utilized two elongated orifices to atomize the fluid hydrocarbon feed. As described in U.S. Pat. No. 5,673,859 to Haruch, the use of a plurality of slot-like outlets atomize the liquid feed into finer particles as the liquid is discharged from the nozzle. U.S. Pat. No. 5,673,859 further described that the use of slots angled relative to one another produce a converging spray, further improving post-discharge atomization of the liquid particles.

However, an FCC hydrocarbon liquid feed nozzle having a plurality of slots is prone to failure over time. The reactor in which the nozzle operates has constantly moving fluidized catalyst particles circulating throughout the reactor. The nozzles are therefore acted upon not only by the hydrocarbon feed passing through the nozzles, but also by the fluidized catalyst. Due to the flow patterns around the nozzle when the liquid hydrocarbon feed is being sprayed into the reactor, the area between the slots is subject to severe erosion of the inter-slot wall.

It is therefore an object of the present invention to provide an improved hydrocarbon feed nozzle, resulting in more efficient atomization of the hydrocarbon feed over a longer useful life.

SUMMARY OF THE INVENTION

These and other objects are achieved by the present invention, directed to a spray nozzle for use in discharging atomized liquid hydrocarbon feed into a fluidized catalytic cracking reactor. The spray nozzle comprises a plurality elongated slots having at least one lateral slot wall formed at an angle of from about 30 to about 60 degrees from the axis of the discharge.

In its preferred embodiment, the slots have a lateral slot wall angle of from about 40 to about 50 degrees from the axis of discharge and most preferably an angle of about 45 degrees.

The objects of the invention will be further described in the following detailed description of the invention, including the attached drawings. The description is intended to describe the preferred embodiment of the present invention, which will be better understood when considered in view of the attached drawings. The detailed description and drawings, however, are not intended to limit the invention in any manner whatsoever.

BRIEF DESCRIPTION OF THE DRAWINGS

The patent of application file contains at least one drawing executed in color. Copies of this patent or patent application publication with color drawings will be provided by the Office upon request and payment of the necessary fee.

FIG. 1A is a front elevation of a first prior art nozzle with lateral slot walls cut from the interior of the nozzle to the exterior of the nozzle at an angle of 0°, or parallel, to the axis of discharge.

FIG. 1B is a cross section view of the first prior art nozzle of FIG. 1A, taken through line A-A.

FIG. 1C is a perspective view of the nozzle of FIGS. 1A and 1B, with the areas most subject to erosion shown in red.

FIG. 2A is a front elevation of an alternative prior art nozzle with lateral slot walls cut from the interior of the nozzle to the exterior of the nozzle at an angle of 90 degrees from the axis of discharge from the slot.

FIG. 2B is a cross section view of the alternative prior art nozzle of FIG. 2A, taken through line A'-A'.

FIG. 2C is a perspective view of the nozzle of FIGS. 2A and 2B, with the areas most subject to erosion shown in red.

FIG. 3A is a front elevation of the preferred embodiment of the nozzle of the present invention with lateral slot walls cut from the interior of the nozzle to the exterior of the nozzle at an angle of 45 degrees from the axis of discharge.

FIG. 3B is a cross section view of the preferred embodiment of the nozzle of the present invention of FIG. 3A, taken through line A"-A".

FIG. 3C is a perspective view of the nozzle of FIGS. 3A and 3B, with the areas most subject to erosion shown in red.

FIG. 4A is a schematic of the flow pattern around the prior art nozzle slot of FIGS. 2A, 2B and 2C.

FIG. 4B is a schematic of the flow pattern around the nozzle slot of the present invention as shown in FIGS. 3A, 3B and 3C.

FIG. 5A is a front elevation of the nozzle of FIGS. 1A, 1B and 1C showing typical erosion after being used in an FCC reactor environment.

FIG. 5B is a side elevation of the nozzle of FIG. 4A showing typical erosion after being used in an FCC reactor environment.

DETAILED DESCRIPTION OF THE PREFERRED EMBODIMENT

With reference to the appended drawings, a first prior art nozzle 102 is shown in FIGS. 1A, 1B and 1C. The first prior art nozzle 102 comprises two elongated slot outlets 104 formed with an area 106 between the slots 104. The lateral walls 108 of the slots 104 are preferably rounded when viewed looking into the nozzle 102, as shown in FIG. 1A. The lateral slot walls 108 are formed in a straight cut configuration, being substantially parallel to the axis of discharge of the atomized liquid hydrocarbon feed from the slot 104.

As shown in FIGS. 2A, 2B and 2C, an alternative prior art nozzle 202 also comprises two elongated slot outlets 204 formed with an area 206 between the slots 204. The lateral walls 208 of the slots 204 are also preferably rounded when viewed looking into the nozzle 202, as shown in FIG. 2A. The lateral slot walls 208, however, are formed in a horizontal cut configuration, being formed about 90 degrees from the axis of discharge of the atomized liquid hydrocarbon feed from the slots 204.

It has been found that the geometry of lateral slot walls 108 and 208, comprising straight cut and horizontal cut configurations, results in the accelerated erosion of the area 106 and 206 between the slots 104 and 204, respectively. FIGS. 5A and 5B show the conventional prior art dual slot nozzle illustrated in FIG. 2A-C, where the area between the slots has eroded.

The preferred embodiment of the nozzle 2 of the present invention, shown in FIGS. 3A, 3B and 3C, comprises two or more elongated slot outlets 4 formed with an area 6 between the slots 4. The lateral slot walls 8 are preferably rounded when looking into the nozzle 2, as shown in FIG. 3A. The lateral slot walls 8, however, are formed in an angled configuration, being from about 30 to about 60 degrees from the axis of discharge of the atomized liquid hydrocarbon feed from the slots 4. The angle is preferably from about 40 to about 50 degrees and most preferably about 45 degrees, as shown in FIG. 3B.

The slots 4 of the nozzles 102 of the present invention can be formed parallel to each other, as shown in FIGS. 3A-3C, or can be angled either toward each other or away from each other, as described in U.S. Pat. No. 5,673,859 referred to above. In any such configuration, however, the lateral slot walls 8 are formed in an angle from about 30 to about 60, preferably from about 40 to about 50 and most preferably about 45 degrees from the axis discharge from the slot 4. Notwithstanding, the slots 4 are formed parallel to each other in the most preferred embodiment.

Additionally, the edges of the slots 4 of the present invention can be smoothed, if desired, to aid the flow of catalyst particles about the nozzles. The smoothed edges are particularly envisioned as a variation of the outer edges of the lateral slot walls 8.

The benefits of the angled lateral slot walls 8 of the present invention are more clearly demonstrated in comparing FIG. 4A to FIG. 4B. FIG. 4A shows CFD calculation results of the flow pattern around the slots 204 of a conventional nozzle 202 in the prior art nozzle of FIGS. 2A-C, with blue arrows representing the liquid hydrocarbon feed/steam flow and red arrows representing catalyst flow. In FIG. 4A, catalyst appears to be drawn into the slot 204.

In contrast, the CFD calculation results of the flow pattern around the nozzle 2 of the present invention in FIG. 4B shows that there is much less of an opportunity for the catalyst to be drawn into and erode the nozzle face, including the area 6 between the slots 4.

In keeping with the above, the present invention includes a method of spraying atomized liquid hydrocarbon feed/steam into an FCC reactor. The method includes the step of passing the feed/steam through a dual slot nozzle 2 having at least one lateral slot wall formed at an angle of from about 30 to about 60 degrees from the axis of the discharge. As described above, the lateral slot walls are preferably from about 40 to about 50 degrees from the axis of discharge and most preferably about 45 degrees from the axis of discharge.

Other variations, modifications and alterations to the preferred embodiment of the present invention described above will make themselves apparent to those skilled in the art. All such deviations to the preferred embodiment described are intended to fall within the spirit and scope of the present invention, limited solely by the appended claims.

All patents referred to herein are hereby incorporated by reference.

We claim:

1. A nozzle for atomized spray of liquid hydrocarbon feed comprising two or more slots having at least one lateral slot wall formed containing an interior edge adjacent to the interior of the nozzle and an exterior edge adjacent to the outer surface of the nozzle, wherein the lateral slot wall is formed at an angle of from about 30 to about 60 degrees from the axis of the discharge, and wherein the exterior edge of the lateral slot wall is rounded and said exterior edge contains substantially no sharp edges or flat surfaces.

2. The nozzle of claim 1 wherein the lateral slot wall is formed at an angle of from about 40 to about 50 degrees from the axis of discharge.

3. The nozzle of claim 1 wherein the lateral slot wall is formed at an angle of about 45 degrees from the axis of discharge.

4. The nozzle of claim 1 wherein the lateral slot wall is formed in a semi-circular configuration when viewed looking into the slot.

5. A method of spraying atomized liquid hydrocarbon feed/steam into a fluidized catalytic cracking reactor comprising the step of passing the feed/steam through a nozzle comprising two or more slots having at least one lateral slot wall formed containing an interior edge adjacent to the interior of the nozzle and an exterior edge adjacent to the outer surface of the nozzle, wherein the at least one lateral slot wall is formed at an angle of from about 30 to about 60 degrees from the axis of the discharge, and wherein the exterior edge of the lateral slot wall is rounded and said exterior edge contains substantially no sharp edges or flat surfaces.

6. The method of claim 5 wherein the at least one lateral slot wall is formed at an angle of from about 40 to about 50 degrees from the axis of discharge.

7. The method of claim 5 wherein the at least one lateral slot wall is formed at an angle of about 45 degrees from the axis of discharge.

* * * * *